(12) United States Patent
Iguchi et al.

(10) Patent No.: US 7,938,633 B2
(45) Date of Patent: May 10, 2011

(54) ELECTRIC COMPRESSOR AND ELECTRIC MOTOR WITH A HOUSING HAVING A CIRCUMFERENTIAL WALL WITH THICK AND THIN PORTIONS

(75) Inventors: Masao Iguchi, Kariya (JP); Kazuya Kimura, Kariya (JP); Akihiro Kawakami, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 1265 days.

(21) Appl. No.: 11/404,333

(22) Filed: Apr. 14, 2006

(65) Prior Publication Data

US 2006/0239843 A1 Oct. 26, 2006

(30) Foreign Application Priority Data

Apr. 15, 2005 (JP) ................................ 2005-118849

(51) Int. Cl.
F04B 35/04 (2006.01)
H02K 5/12 (2006.01)
H02K 1/06 (2006.01)

(52) U.S. Cl. .................. 417/423.7; 417/423.14; 310/64; 310/89; 310/216.049

(58) Field of Classification Search ............... 417/410.1, 417/415–417, 902, 423.7, 423.14; 310/194, 310/64, 89, 216.049, 216.055, 216.058; 335/229–234
See application file for complete search history.

(56) References Cited

U.S. PATENT DOCUMENTS

| | | | | |
|---|---|---|---|---|
| 1,967,033 A * | 7/1934 | Lipman | ............................ | 62/469 |
| 2,066,740 A | 1/1937 | Ripsch | ............................ | 172/36 |
| 2,947,467 A * | 8/1960 | Palmer | ............................ | 417/353 |
| 3,003,684 A * | 10/1961 | Tarleton | ......................... | 417/372 |
| 3,291,383 A * | 12/1966 | Butts | ............................... | 417/390 |
| 3,311,293 A * | 3/1967 | Moffatt | .......................... | 418/101 |
| 4,277,955 A * | 7/1981 | Parker | ............................... | 62/510 |
| 4,547,131 A * | 10/1985 | Riffe et al. | ........................ | 417/53 |
| 4,561,829 A * | 12/1985 | Iwata et al. | .................... | 417/368 |
| 4,601,644 A * | 7/1986 | Gannaway | ..................... | 417/363 |
| 4,623,304 A * | 11/1986 | Chikada et al. | ................ | 417/312 |
| 4,888,510 A * | 12/1989 | Hunt | ................................ | 310/54 |
| 4,903,497 A * | 2/1990 | Zimmern et al. | ................ | 62/113 |
| 4,958,990 A * | 9/1990 | Gordon et al. | .............. | 417/410.3 |
| 5,218,252 A * | 6/1993 | Iseman et al. | .................... | 310/64 |
| 5,232,354 A * | 8/1993 | Clement | ......................... | 417/569 |
| 5,331,238 A | 7/1994 | Johnsen | ............................ | 310/58 |
| 6,582,207 B2 * | 6/2003 | Matsumoto et al. | ........ | 417/410.1 |
| 6,836,051 B2 * | 12/2004 | Hiwaki et al. | .............. | 310/254.1 |
| 2002/0057971 A1 * | 5/2002 | Shida et al. | ................. | 417/410.1 |
| 2003/0143090 A1 | 7/2003 | Iritani et al. | ................ | 417/410.5 |
| 2004/0013544 A1 | 1/2004 | Kimura et al. | .............. | 417/410.5 |
| 2004/0124731 A1 * | 7/2004 | Kimura et al. | ................. | 310/216 |
| 2005/0115055 A1 | 6/2005 | Kimura et al. | ................... | 29/596 |

FOREIGN PATENT DOCUMENTS

| | | |
|---|---|---|
| JP | 57-52341 | 3/1982 |
| JP | 2004-100683 | 4/2004 |
| JP | 2004-112988 | 4/2004 |
| JP | 2004-197687 | 7/2004 |
| JP | 2005-80416 | 3/2005 |

* cited by examiner

*Primary Examiner* — Charles G Freay
(74) *Attorney, Agent, or Firm* — Woodcock Washburn LLP

(57) ABSTRACT

An electric compressor includes an electric motor, a compression mechanism driven by the electric motor, and a housing for accommodating the electric motor and the compression mechanism. The housing is formed such that the stator is fitted thereto. The housing has a plurality of thick portions and a plurality of thin portions. The center of the thickness of each thick portion is located outside of the center of the thickness of each thin portion with respect to a radial direction of the housing. As a result, even if the housing is deformed, the fixation of the stator to the housing is reliably maintained. Further, the weight of the electric compressor is reduced.

11 Claims, 3 Drawing Sheets

ELECTRIC COMPRESSOR AND ELECTRIC MOTOR WITH A HOUSING HAVING A CIRCUMFERENTIAL WALL WITH THICK AND THIN PORTIONS

CROSS REFERENCE TO RELATED APPLICATION

This application claims priority to Japanese application number 2005-118849 filed Apr. 15, 2005.

BACKGROUND OF THE INVENTION

The present invention relates to an electric compressor having an electric motor and a compression mechanism accommodated in a housing.

Conventionally, electric compressors have been used as compressors for vehicle air conditioners. Such an electric compressor includes an electric motor and a compression mechanism that are integrated (for example, refer to Japanese Laid-Open Patent Publication Nos. 2004-100683 and 2004-112988). FIG. 6 is a cross-sectional view showing such an electric compressor 30. As shown in FIG. 6, the electric compressor 30 has a compressor housing 31 forming an outer wall of the compressor 30. The compressor housing 31 includes a first housing member 31a and a second housing member 31b. The first housing member 31a and the second housing member 31b are secured to each other by fasteners 32, so that a sealed space 33 is defined in the compressor housing 31. A rotary shaft 34, which is rotatably supported by the first housing member 31a, is accommodated in the sealed space 33. An electric motor 35 and a compression mechanism 36 are also accommodated in the sealed space 33. In FIG. 6, a dashed line labeled with a letter L represents a central axis of the rotary shaft 34 (a central axis of the electric compressor 30). The electric motor 35 has a stator 35a and a rotor 35b, which is surrounded by the stator 35a and fixed to the rotary 30 shaft 34. The compression mechanism 36 is a scroll type compression mechanism having a fixed scroll 36a and a movable scroll 36b.

When the compression mechanism 36 is actuated by the electric motor 35, low-temperature and low-pressure refrigerant gas is supplied to the sealed space 33 from an external refrigerant circuit (not shown) via an inlet (not shown) formed in the first housing member 31a. The refrigerant gas is then drawn into the compression mechanism 36 through the electric motor 35. The refrigerant gas drawn into the compression mechanism 36 is compressed by the compression mechanism 36, and becomes high-temperature and high-pressure refrigerant gas. Then, the refrigerant gas is discharged to the external refrigerant circuit (not shown) through an outlet 37 formed in the second housing member 31b. Since the refrigerant gas is guided to the compression mechanism 36 from the external refrigerant circuit through the electric motor 35, the refrigerant gas serves to cool the electric motor 35.

In the above described electric compressor 30, the annular stator 35a is fitted to the compressor housing 31, specifically, to the first housing member 31a, by shrink fitting or press fitting.

To reduce the weight of the electric compressor 30, for example, the thickness of the compressor housing 31 may be reduced. However, reduction of the thickness of the compressor housing 31 is not easy for the following reasons. That is, when the temperature and pressure in the compressor housing 31 are increased due to an increase in the ambient temperature (for example, the temperature in the vehicle engine compartment), the compressor housing 31 is deformed due to the pressure difference between the inside and the outside of the compressor housing 31. Thus, if the compressor housing 31 is made excessively thin, there is a possibility that the electric motor 35 (the stator 35a) cannot be firmly fixed to the housing 31. For example, if the amount of deformation of the compressor housing 31 exceeds the amount of interference of the stator 35a, the stator 35a cannot be firmly fixed to the housing 31. Particularly, if the compressor housing 31 is made of aluminum in view of reduction of the weight, the influence of deformation becomes noticeable. Therefore, the thickness of the compressor housing 31 needs to be determined such that, a sufficient interference for maintaining the fixation of the electric motor 35 (the stator 35a) remains even if the compressor housing 31 is deformed.

SUMMARY OF THE INVENTION

Accordingly, it is an objective of the present invention to provide an electric compressor the weight of which can be reduced while maintaining a favorable fixation of a stator to a housing even if the housing is deformed.

To achieve the foregoing objective, one aspect of the present invention provides an electric compressor including an electric motor, a compression mechanism, and a housing. The electric motor has a stator. The compression mechanism is driven by the electric motor to compress gas. The housing accommodates the electric motor and the compression mechanism. The housing is formed such that the stator is fitted thereto. The housing includes a thick portion and a thin portion, which have different thicknesses. A center of the thickness of the thick portion is located outside of a center of the thickness of the thin portion with respect to a radial direction of the housing.

A second aspect of the present invention provides an electric motor including a stator, a rotor, a rotary shaft fixed to the rotor, and a housing. The housing accommodates the stator, the rotor, and the rotary shaft. The housing is formed such that the stator is fitted thereto. The housing includes a thick portion and a thin portion, which have different thicknesses. A center of the thickness of the thick portion is located outside of a center of the thickness of the thin portion with respect to a radial direction of the housing.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF ILLUSTRATIVE EMBODIMENTS

One embodiment of the present invention will now be described with reference to FIGS. 1 to 4.

Figure 1:
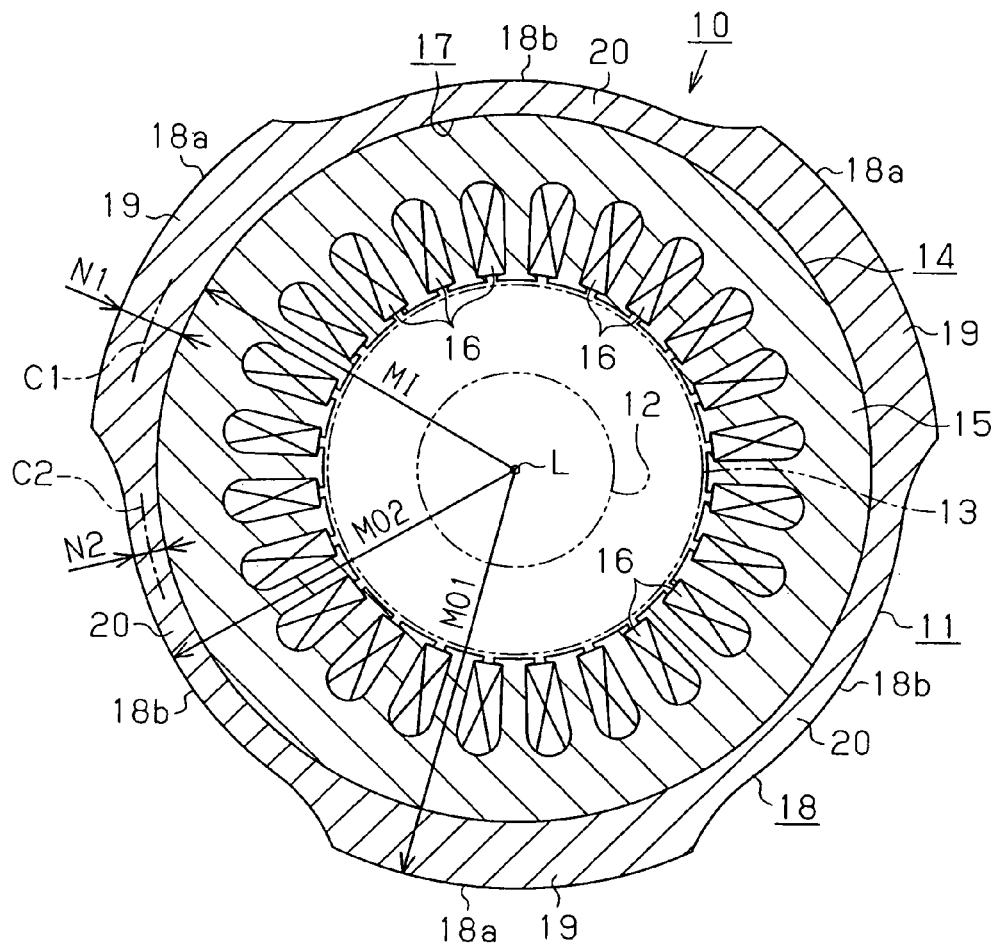
FIG. 1 is a cross-sectional view illustrating a compressor housing according to a first embodiment of the present invention.
Figure 6:
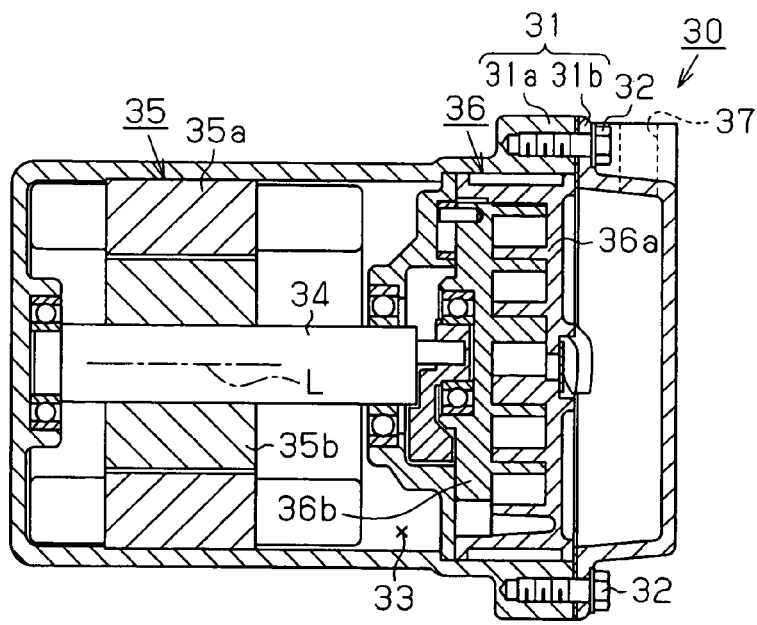
FIG. 6 is a schematic cross-sectional view illustrating a typical electric compressor.

FIG. 1 is a cross-sectional view of an electric compressor that has an electric motor 10 and a compression mechanism (not shown) that are integrated in a compressor housing 11 as a housing of the electric compressor. Specifically, FIG. 1 shows a section of the compressor that corresponds to the electric motor 10. The electric compressor is applied to, for example, a vehicle air conditioner, and is located in the engine compartment of a vehicle. The compressor housing 11 accommodates the electric motor 10 and the compression mechanism. The compression mechanism is a scroll type compression mechanism having a fixed scroll and a movable scroll. Since it is similar to that of the compression mechanism 36 shown in FIG. 6, the structure of the compression mechanism of FIG. 1 is not illustrated. In this embodiment, the compressor housing 11 is made of aluminum.

As shown in FIG. 1, components of the electric motor 10, that is, a rotary shaft 12, a rotor 13, and a stator 14 are located in the compressor housing 11. The rotary shaft 12 is rotatably supported by the compressor housing 11 and is coupled to the compression mechanism with the movable scroll.

The rotor 13 is fitted about the outer circumference of the rotary shaft 12 to rotate integrally with the rotary shaft 12. The stator 14 includes a stator core 15 and a plurality of coils 16 wound about the stator core 15 (specifically, teeth of the stator core 15). The stator core 15 is formed by laminating silicon steel plates, which are obtained by pressing, along a central axis L of the rotary shaft 12. The stator 14 is located about the rotor 13, and fixed to an inner circumferential surface 17 of the compressor housing 11 by shrink fitting or press fitting.

When electricity is supplied to the coils 16, the electric motor 10 rotates the rotary shaft 12 along with the rotor 13. When the movable scroll is caused to orbit relative to the fixed scroll by the rotary shaft 12, the compression mechanism compresses low-temperature and low-pressure refrigerant gas drawn from an external refrigerant circuit (not shown). The low-temperature and low-pressure refrigerant gas is drawn to the inside of the compressor housing 11 from the external refrigerant circuit through an inlet (not shown) formed in the electric compressor, and is guided to the compression mechanism through the electric motor 10. After drawn into the compression mechanism, the refrigerant gas is compressed to high-temperature and high-pressure refrigerant gas by compression action of the compression mechanism, and is sent to the external refrigerant circuit through an outlet (not shown) formed in the electric compressor.

Hereinafter, a structure of the compressor housing 11 will be described.

The inner circumferential surface 17 of the compressor housing 11 is circular in a cross-section perpendicular to its central axis L. That is, the inner circumferential surface 17 has a constant distance (radius) from the central axis L along the entire circumference. In FIG. 1, the distance between the central axis L and the inner circumferential surface 17 is represented by a reference mark MI. On the other hand, an outer circumferential surface 18 of the compressor housing 11 includes first circumferential surface sections 18a and second circumferential surface sections 18b, which have different distances (radiuses) from the central axis L. The outer circumferential surface 18 is thus noncixcular in a crosssection perpendicular to the central axis L. In FIG. 1, the distance between the central axis L and each first circumferential surface section 18a is represented by a reference mark MO1, and the distance between the central axis L and each second circumferential surface section 18b is represented by a reference mark M02. Each of the first circumferential surface sections 18a and the second circumferential surface sections 18b is an arcuate surface that is parallel to, or coaxial with the inner circumferential surface 17.

Since the outer circumferential surface 18 has the first circumferential surface sections 18a and the second circumferential surface sections 18b, which have different distances from the central axis L, the compressor housing 11 (specifically, the circumferential wall of the housing 11) of this embodiment has thick portions (first circumferential wall portions) 19 and thin portions (second circumferential wall portions) 20, which have different thicknesses. Each thick portion 19 is defined by the inner circumferential surface 17 and one of the first circumferential surface sections 18a, and has a thickness N1 defined by the value obtained by subtracting the distance MI from the distance M01. Each thin portion 20 is defined by the inner circumferential surface 17 and one of the second circumferential surface sections 18b, and has a thickness N2 defined by the value obtained by subtracting the distance MI from the distance M02 (thickness N2<thickness N1). FIG. 1 shows the compressor housing 11 in which the thickness N1 of each thick portion 19 is twice the thickness N2 of each thin portion 20. The thickness N1 of the thick portions 19 and the thickness N2 of the thin portions 20 are set to values that no problem is caused in terms of the strength (problems such as cracks are not produced) even if the compressor housing 11 is deformed due to the pressure difference between the inside and the outside of the compressor housing 11.

In this embodiment, the number of the thick portions 19 and the number of thin portions 20 are both three. The three thick portions 19 have the same shape and the same size, and the three thin portions 20 have the same shape and the same size. The thick portions 19 and the thin portions 20 are integrally formed and are alternately arranged along the circumferential direction of the compressor housing 11 at equal intervals. That is, each thick portion 19 is located between an adjacent pair of the thin portions 20, and each thin portion 20 is located between an adjacent pair of the thick portions 19.

The first circumferential surface sections 18a, which form the thick portions 19, are located outside of the second circumferential surface sections 18b, which form the thin portions 20, in the radial direction of the compressor housing 11. That is, the maximum radius of the circumferential wall of the compressor housing 11 is the distance M01, which is the distance between the central axis L and each first circumferential surface section 18a. The outer shape of the circumferential wall of the housing 11 is obtained by cutting out parts of a circle that has the same radius as the maximum radius (MO1). The cutout parts correspond to the thin portions 20. In the compressor housing 11 thus constructed, a center line C1 of the thickness N1 of each thick portion 19 is radially outside of a center line C2 of the thickness N2 of each thin portion 20. In other words, the center line C2 of the thickness N2 of each thin portion 20 is radially inside of the center line C1 of the thickness N1 of each thick portion 19. The center line C1 divides the thickness N1 of each thick portion 19 into two equal parts with respect to the radial direction of the housing 11, and the center line C2 divides the thickness N2 of each thin portion 20 into two equal parts with respect to the radial direction of the housing 11.

Hereinafter, operation of the compressor housing 11 will be described with reference to FIG. 2.

Figure 2:
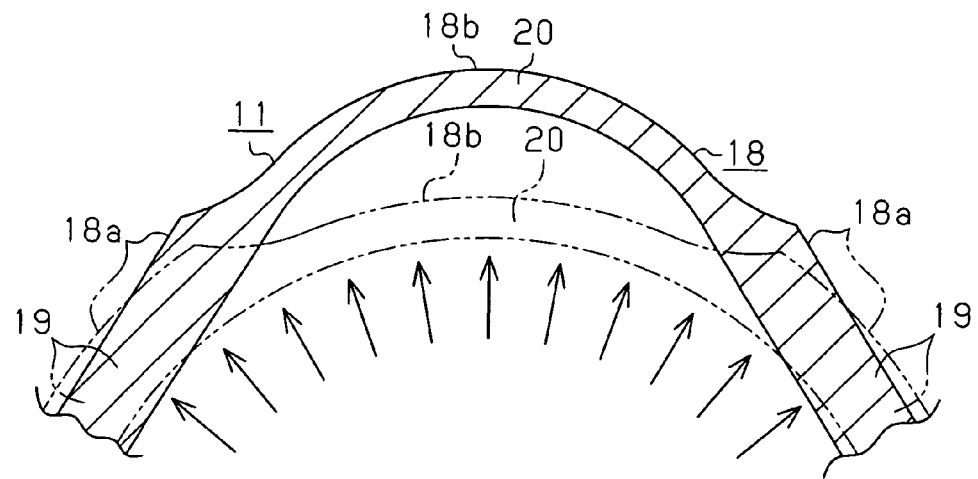
FIG. 2 is a diagram showing the compressor housing of FIG. 1 in a state before deformation and a state after deformation.

FIG. 2 shows a state in which the compressor housing 11 is deformed by a pressure difference between the inside and the outside of the compressor housing 11. Arrows of solid lines in FIG. 2 represent the internal pressure acting on the compressor housing 11. FIG. 2 shows a part of the compressor housing 11. The compressor housing 11 before the deformation is depicted with alternate long and two short dashes lines, and the compressor housing 11 after the deformation is depicted with solid lines. In FIG. 2, the amount of the deformation of the housing 11 is exaggerated for purposes of illustration.

When the temperature and pressure in the compressor housing 11 are increased due to an increase in the ambient temperature (for example, the temperature in the engine compartment, in which the electric compressor is located), the internal pressure of the compressor housing 11 increases. Then, due to the pressure difference between the inside and the outside, the compressor housing 11 is deformed at the three thin portions 20, which have lower strength than the thick portions 19. At this time, the three thin portions 20, which are located inside of the thick portions 19 in the radial direction of the compressor housing 11, are deformed to protrude (bulge) outward in the radial direction of the compressor housing 11.

On the other hand, deformation of the compressor housing 11 is suppressed at the thick portions 19, which have a greater thickness and a greater strength than the thin 30 portions 20. As the thin portions 20 are deformed outward in the radial direction of the compressor housing 11, the thick portions 19 receive a force directed inward in the radial direction of the compressor housing 11, that is, a force fastening the stator 14. As a result, the thick portions 19 continues to fasten the stator 14 at sections of the inner circumferential surface 17 that correspond to the thick portions 19. Therefore, even if the compressor housing 11 is deformed, the stator 14 is fastened by the thick portions 19, and the fixation of the stator 14 to the housing 11 is maintained.

Figure 3:
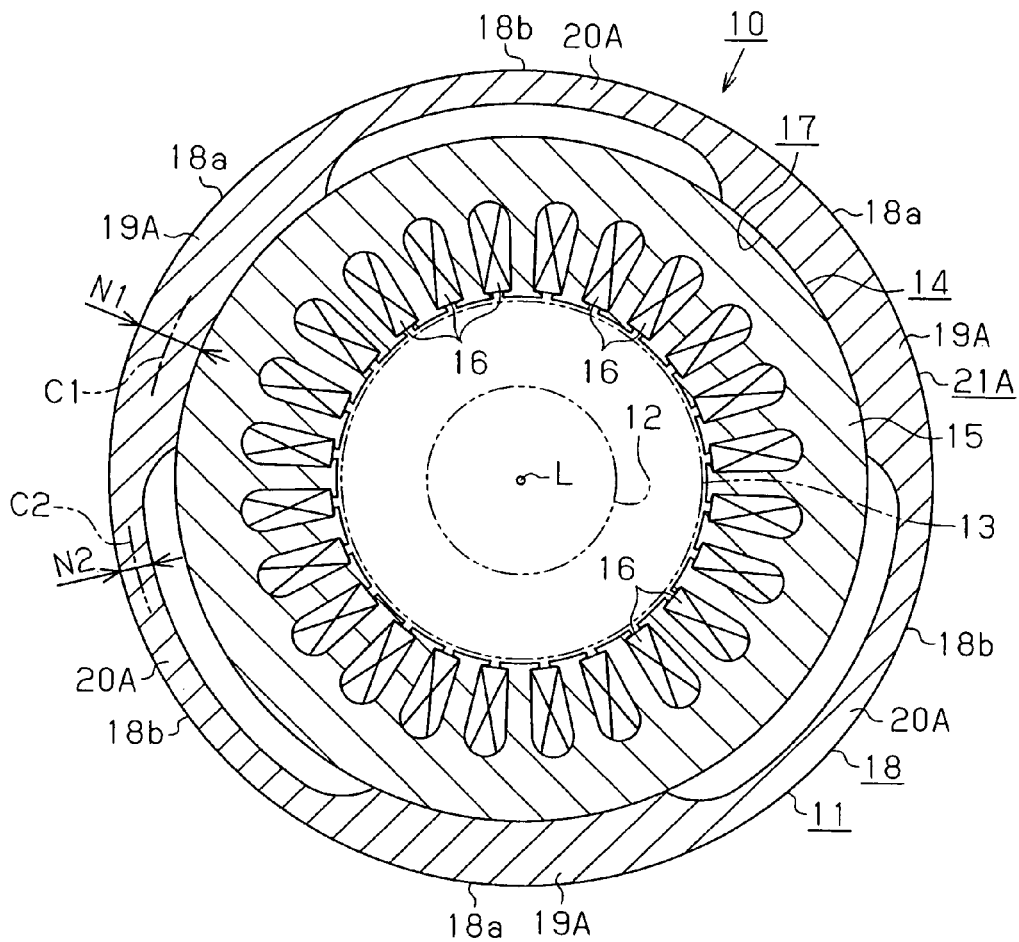
FIG. 3 is a cross-sectional view illustrating a compressor housing as a comparison example.

FIG. 3 shows a compressor housing 21A of a comparison example, in which the arrangement of thick portions 19A and thin portions 20A are reversed from the compressor housing 11 of the present embodiment.

Figure 4:
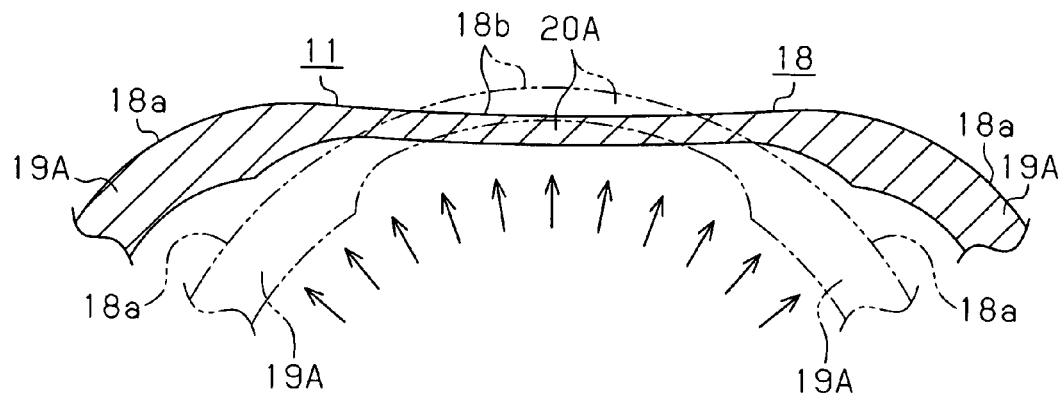
FIG. 4 is a diagram showing the compressor housing of FIG. 3 in a state before deformation and a state after deformation.

In the compressor housing 21A of FIG. 3, a center line C1 of the thickness NI of each thick portion 19A is radially inside of a center line C2 of the thickness N2 of each thin portion 20A. In this structure, when a pressure difference is created between the inside and the outside of the compressor housing 21A, the compressor housing 21A receives a force that deforms the three thin portions 20A inward in the radial direction as shown in FIG. 4. The force deforms each thin portion 20A such that a circumferential center of the thin portion 20A protrudes inward in the radial direction of the compressor housing 21A, and circumferential ends of the thin portion 20A are warped outward in the radial direction of the compressor housing 21A. As each thin portion 20A is warped outward in the radial direction at the circumferential ends, the thick portions 19A receive a force directed outward in the radial direction of the compressor housing 21A, that is, a force in a direction opposite to the direction for fastening the stator 14. As a result, the thick portions 19A are deformed such that sections of the inner circumferential surface 17 that correspond to the thick portions 19A separate from the stator 14, and cannot maintain the fastening state. Therefore, when the compressor housing 21A is deformed, the fixation of the stator 14 to the housing 21A becomes unstable.

This embodiment provides the following advantages.

(1) The compressor housing 11 (specifically, the circumferential wall of the housing 11) has the thick portions 19 and the thin portions 20 of different thicknesses. The center line C1 of each thick portion 19 is located outside of the center line C2 of the thin portion 20 in the radial direction. That is, the center of the thickness of each thick portion 19 is located outside of the center of the thickness of each thin portion 20 with respect to the radial direction of the circumferential wall of the housing 11. As a result, when a pressure difference is created between the inside and the outside of the compressor housing 11, the thin portions 20, which have relatively a low strength, are deformed outward in the radial direction, and deformation of the thick portions 19 is suppressed. Therefore, even if the compressor housing 11 is deformed, the stator 14 is reliably held by the thick portions 19, and the fixation of the stator 14 to the thick portion 19 is maintained. Therefore, regardless of deformation of the compressor housing 11, the fixation of the stator 14 to the housing 11 is reliably maintained. Also, the formation of the thick portions 19 and the thin portions 20 in the compressor housing 11 reduces the weight of the compressor housing 11 compared to the case where the entire housing 11 is formed to have an even thickness.

(2) The stator 14 is fastened at least by sections of the inner circumferential surface 17 of the compressor housing 11 (the circumferential wall) that correspond to the thick portions 19. Therefore, even if sections of the inner circumferential surface 17 of the compressor housing 11 that correspond to the thin portions 20 cannot hold the stator 14 due to deformation of the thin portions 20, deformation of the sections of the inner circumferential surface 17 of the compressor housing 11 that correspond to the thick portions 19 is suppressed, and the sections continue fastening the stator 14.

(3) The three thick portions 19 are arranged at equal intervals along the circumferential direction of the compressor housing 11 (the circumferential wall). Also, the three thick portions 19 and the three thin portions 20 are alternately arranged along the circumferential direction of the compressor housing 11. Therefore, even if the thin portions 20 are deformed, the thick portions 19, which are evenly arranged along the circumferential direction of the compressor housing 11, stably hold the stator 14.

The above illustrated embodiment may be modified as follows.

The compression mechanism is not limited to a scroll type, but may be changed to, for example, a vane type or a piston type.

The number of the thick portions 19 and the number of the thin portions 20 may be changed. For example, the number of the thick portions 19 and the number of the thin portions 20 may be two, respectively. In this case, by arranging the two thick portions 19 to oppose to each other, that is, by arranging the two thick portions 19 at 180° interval, the fixation of the stator 14 is maintained by the two thick portions 19 even if the compressor housing 11 is deformed.

Figure 5:
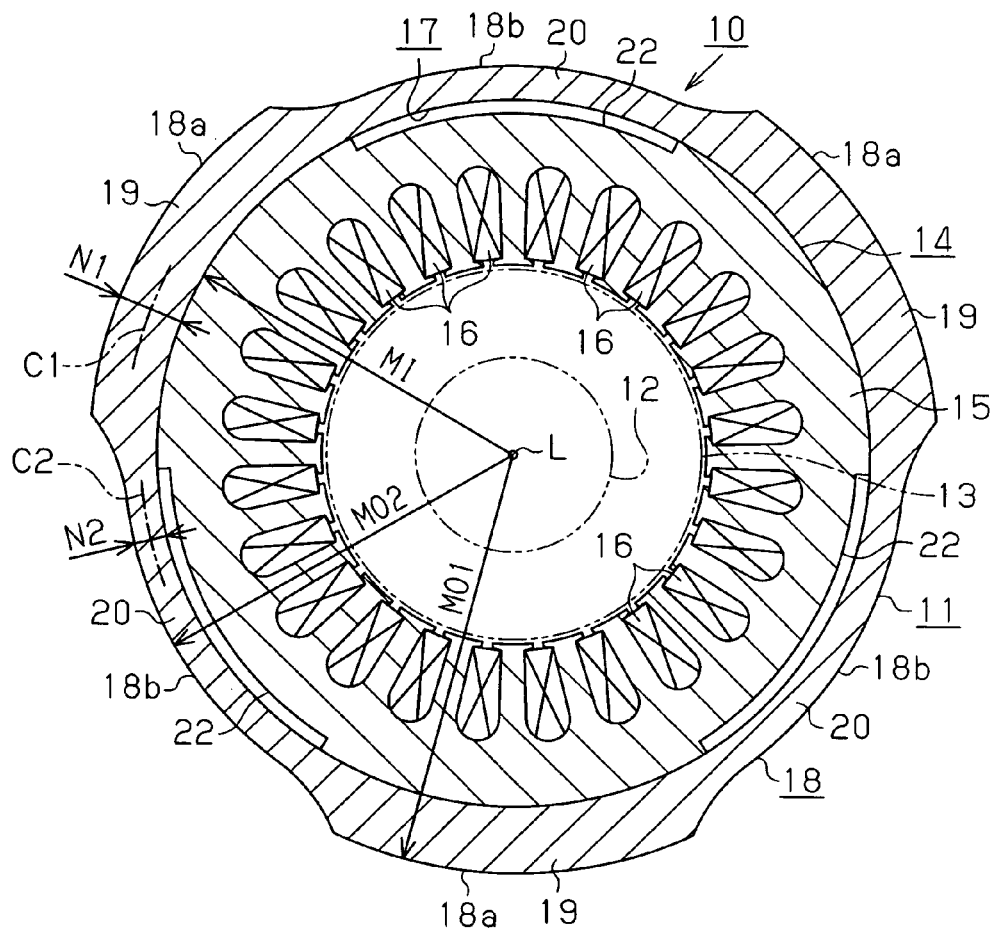
FIG. 5 is a cross-sectional view illustrating a compressor housing according to a modified embodiment.

As shown in FIG. 5, at least one (three in FIG. 5) groove (recess) 22 extending along the axis of the stator 14 may be formed on the outer circumferential surface of the stator 14. A gap is defined between a section of the outer circumferential surface of the stator 14 that corresponds to each groove 22 and the inner circumferential surface 17 of the compressor housing 11 (the circumferential wall). The gap functions as a suction gas passage that conducts refrigerant gas, which has been drawn into the compressor housing 11 through the inlet, to the compression mechanism. The grooves 22 are formed in the stator 14 to be arranged at circumferential positions each opposing one of the thin portions 20. Sections of the outer circumferential surface of the stator 14 in which no groove 22 is formed are located in circumferential positions each opposing one of the thick portions 19, and function as fitting portions fitted to the inner circumferential surface 17 of the compressor housing 11.

The structure of the stator 14 (the stator core 15), for example, the shape of the teeth, may be changed. The manner in which the coils 16 are wound about the stator core 15 may be either of the concentrated winding or the distributed winding.

The illustrated embodiment relates to the electric compressor (electric device) having the integrated electric motor 10 and compression mechanism (rotating machine). However, the present invention may be applied to an electric motor that includes a housing having thick portions and thin portions that are the same as the thick portions 19 and the thin portions 20 in the illustrated embodiment. In this case, the electric motor has a structure equivalent to the structure shown in FIG. 6 in which the compression mechanism 36 is removed from the electric compressor 30, and has the same cross-section as that shown in FIG. 1.

Therefore, the present examples and embodiments are to be considered as illustrative and not restrictive and the invention is not to be limited to the details given herein, but may be modified within the scope and equivalence of the appended claims.

What is claimed:

1. An electric compressor comprising:
   an electric motor having a stator;
   a compression mechanism that is driven by the electric motor to compress gas; and
   a housing for accommodating the electric motor and the compression mechanism, the housing having a circumferential wall, which is formed such that the stator is fitted thereto, the circumferential wall including a thick portion and a thin portion, which are arranged at the same position as the stator with respect to an axial direction of the circumferential wall and have different thicknesses, wherein a center of the thickness of the thick portion is located outside of a center of the thickness of the thin portion with respect to a radial direction of the circumferential wall so that the thin portion is allowed to be deformed outward in the radial direction and the deformation of the thin portion generates a force that is applied to the thick portion and is directed inward in the radial direction for fastening the stator,
   wherein the circumferential wall has an inner circumferential surface and an outer circumferential surface, a whole surface of the inner circumferential surface having a constant radius, wherein at least a section of the inner circumferential surface that corresponds to the thick portion fastens the stator, and at least a section of the outer circumferential surface that corresponds to the thick portion is an arc surface.

2. The electric compressor according to claim 1, wherein a section of the outer circumferential surface that corresponds to the thick portion is located outside of a section of the outer circumferential surface that corresponds to the thin portion with respect to the radial direction of the circumferential wall.

3. The electric compressor according to claim 1, wherein a plurality of the thick portions are formed to be arranged at equal intervals in a circumferential direction of the circumferential wall.

4. The electric compressor according to claim 1, wherein the thick portion is formed at each of at least three positions in a circumferential direction of the circumferential wall, and wherein the thick portions at the three positions are arranged at equal intervals in the circumferential direction of the circumferential wall.

5. The electric compressor according to claim 1, wherein the thick portion is one of a plurality of substantially identically thick portions formed in the circumferential wall, wherein the thin portion is one of a plurality of substantially identically thin portions formed in the circumferential wall, the number of the thin portions being the same as the number of the thick portions, and the thick portions and the thin portions being alternately arranged along a circumferential direction of the circumferential wall and extending completely therearound.

6. The electric compressor according to claim 1, wherein an outer circumferential surface of the stator has a recess that extends along an axis of the stator, and wherein a gap is defined between a section of the outer circumferential surface of the stator that corresponds to the recess and an inner circumferential surface of the circumferential wall.

7. The electric compressor according to claim 6, wherein the stator is fitted to the circumferential wall such that the recess is located at a circumferential position that is opposed to the thin portion.

8. An electric compressor comprising:
   an electric motor having a stator;
   a compression mechanism that is driven by the electric motor to compress gas; and
   a housing for accommodating the electric motor and the compression mechanism, the housing including a circumferential wall having an inner circumferential surface, a whole surface of the inner circumferential surface having a constant radius, the stator being fitted to the inner circumferential surface, the circumferential wall including a thick portion and a thin portion, which are arranged at the same position as the stator with respect to an axial direction of the circumferential wall and have different thicknesses, wherein a section of an outer circumferential surface of the circumferential wall that corresponds to the thick portion is located outside of a section of the outer circumferential surface of the circumferential wall that corresponds to the thin portion with respect to a radial direction of the circumferential wall so that the thin portion is allowed to be deformed outward in the radial direction and the deformation of the thin portion generates a force that is applied to the thick portion and is directed inward in the radial direction for fastening the stator, and wherein at least the section of the inner circumferential surface that corresponds to the thick portion fastens the stator,
   wherein at least a section of the outer circumferential surface that corresponds to the thick portion is an arc surface.

9. The electric compressor according to claim 8, wherein the thick portion is one of a plurality of substantially identically thick portions formed in the circumferential wall, wherein the thin portion is one of a plurality of substantially identically thin portions formed in the circumferential wall, the number of the thin portions being the same as the number of the thick portions, and the thick portions and the thin portions being alternately arranged along a circumferential direction of the circumferential wall and extending completely therearound.

10. An electric motor comprising:
    a stator;
    a rotor;
    a rotary shaft fixed to the rotor; and
    a housing for accommodating the stator, the rotor, and the rotary shaft, the housing having a circumferential wall, which is formed such that the stator is fitted thereto, the circumferential wall including a thick portion and a thin portion, which are arranged at the same position as the stator with respect to an axial direction of the housing and have different thicknesses, wherein a center of the thickness of the thick portion is located outside of a center of the thickness of the thin portion with respect to a radial direction of the circumferential wall so that the thin portion is allowed to be deformed outward in the radial direction and the deformation of the thin portion generates a force that is applied to the thick portion and is directed inward in the radial direction for fastening the stator, wherein the circumferential wall has an inner circumferential surface and an outer circumferential surface, a whole surface of the inner circumferential surface having a constant radius, wherein at least a section of the inner circumferential surface that corresponds to the thick portion fastens the stator, and at least a section of the outer circumferential surface that corresponds to the thick portion is an arc surface.

11. The electric motor according to claim 10, wherein the thick portion is one of a plurality of substantially identically thick portions formed in the circumferential wall, wherein the thin portion is one of a plurality of substantially identically thin portions formed in the circumferential wall, the number of the thin portions being the same as the number of the thick portions, and the thick portions and the thin portions being alternately arranged along a circumferential direction of the circumferential wall and extending completely therearound.

* * * * *